(12) United States Patent
Quesnel

(10) Patent No.: US 6,389,213 B1
(45) Date of Patent: May 14, 2002

(54) DEADEND WEDGE DESIGN

(75) Inventor: Wayne L. Quesnel, Moore, SC (US)

(73) Assignee: Alcoa Fujikura Limited, Franklin, TN (US)

(*) Notice: Subject to any disclaimer, the term of this patent is extended or adjusted under 35 U.S.C. 154(b) by 0 days.

(21) Appl. No.: 09/780,867

(22) Filed: Feb. 9, 2001

Related U.S. Application Data

(60) Provisional application No. 60/182,112, filed on Feb. 12, 2000.

(51) Int. Cl.$^7$ ................................................. G02B 6/00
(52) U.S. Cl. ...................................... 385/136; 385/135
(58) Field of Search ................................ 385/134, 135, 385/136, 147

(56) References Cited

U.S. PATENT DOCUMENTS

| | | | |
|---|---|---|---|
| 3,832,539 A | 8/1974 | Oram | 240/41.3 |
| 3,911,266 A | 10/1975 | Oram | 240/52.1 |
| 4,674,832 A | 6/1987 | Hirai et al. | 350/96.21 |
| 4,699,683 A | 10/1987 | McCowin | 156/353 |
| 4,719,672 A | 1/1988 | Apperson et al. | 24/135 |
| 4,761,053 A | 8/1988 | Cogelia et al. | 350/96.23 |
| 4,772,090 A | 9/1988 | Atkins et al. | 350/96.23 |
| 4,779,951 A | 10/1988 | Bouvard et al. | 350/96.21 |
| 4,795,856 A | 1/1989 | Farmer | 174/40 |
| 4,832,442 A | 5/1989 | Pappas | 350/96.23 |
| 5,092,663 A | 3/1992 | Hivner | 385/100 |
| 5,575,690 A | 11/1996 | Eaton | 439/717 |
| 5,647,046 A | 7/1997 | Cowen et al. | 385/136 |
| 5,734,776 A * | 3/1998 | Puetz | 385/134 |
| 6,201,919 B1 * | 3/2001 | Puetz et al. | 385/134 |
| 6,226,436 B1 * | 5/2001 | Daoud et al. | 385/135 |
| 6,275,641 B1 * | 8/2001 | Daoud | 385/135 |
| 6,301,424 B1 * | 10/2001 | Hwang | 385/135 |
| 6,307,997 B1 * | 10/2001 | Walters et al. | 385/134 |

* cited by examiner

*Primary Examiner*—Neil Abrams
*Assistant Examiner*—Thanh-Tam Le
(74) *Attorney, Agent, or Firm*—Tracey D. Beiriger

(57) ABSTRACT

An apparatus, called a wedge deadend, used to secure aerial fiber optic transmission lines or cables. The deadend and secured cable can effectively be attached to support structures such as poles or towers. The wedge deadend has a body that consists of multiple hinged segments that are opened and closed to load and access cable. The body accommodates multiple interlocking wedges which track the inside of the body and interlock with each other via teeth. Both the body segments and wedges are tapered such that one end of the body when closed is angled inwardly. When the body is closed, the wedges form an opening that is sized and textured to grip cables of various range diameters. The wedges are designed to compress the encased cable evenly along the entire contact surface of the cable.

14 Claims, 8 Drawing Sheets

DEADEND WEDGE DESIGN

This application claims benefit of provisional application Ser. No. 60/182,112, filed Feb. 12, 2000.

BACKGROUND OF THE INVENTION

1. Field of the Invention

This invention pertains to a lightweight, compact apparatus, referred to as a deadend used to attach aerial fiber optic transmission, ground wire or conductor cables to support structures such as poles or towers. Specifically, this invention relates to a deadend that has a body that holds multiple wedges which form an opening for receiving cable.

2. Technology Review

Existing deadends are generally bulky and difficult to install. Several different types of deadend technology are presently used for joining aerial fiber optic transmission, ground wire or conductor cables to support structures. One type of deadend widely used is the formed wire deadend shown in FIG. 1. These deadends consist of bundles of wires joined side by side and formed into a helical ribbon. Three to four of these bundles are wrapped around the cable side by side to virtually surround the cable. A second layer of formed wires are wrapped over this inner layer. This second layer has a formed bail or attaching cable which is placed over a thimble clevis attached to the support structure.

The formed wire deadend is difficult to install. For example, wrapping the formed wires around the cable requires a great deal of hand strength. Also, the installer's fingers often get pinched while wrapping the formed wires around the cable. Further, these deadends can be as long as twelve feet and are heavy and bulky, and therefore, cannot be installed from the support structure. Also accurate alignment, which often takes a great amount of time, must be maintained between the bundles of formed wires.

A second type of deadend, shown in FIG. 2 is a deadend in which wire retaining rods, similar to the formed wire deadend described above, are wrapped about and surround the cable. A housing with wedges is placed about the wire rods and the cable sits within a groove formed by the wedges. The cable is gripped by the wedges as they are moved forward and squeeze the cable. Many of the problems associated with the formed wire deadend are also associated with this deadend.

Bolted deadends, as shown in FIGS. 3 and 4, are other types of deadend currently used. These deadends consist of a base plate with a groove sized to fit a specified cable design and cannot be easily adapted to accommodate various sized cables. A series of plates with matching grooves are bolted onto the top of the base plate with the cable sandwiched between. Bolted deadends are typically used for large cables and cables carrying very high cable loads. Again, this type of deadend is very heavy. Further, because of the numerous bolts that must be tightened, the bolted deadend is difficult and time-consuming to install.

Applicant teaches a deadend for ADSS cable which is compact, lightweight and inexpensive to manufacture in U.S. Pat. 5,647,046. This deadend, which is easy to install, meets the system performance requirements of strength and long term reliability without deteriorating cable performance and can be installed from the support structure. There is, however, a need for a deadend for optical ground wire (OPT-GW) cable that is also compact, lightweight and inexpensive to manufacture. It is desirable that this deadend also be easy to install and meet all system performance requirements of strength and long term reliability required of OPT-GW deadends without deteriorating cable performance. Further, the deadend should be capable of being installed from the support structure.

It is an object of the present invention to provide a deadend for joining aerial fiber optic transmission, ground wire or conductor cables to support structures that is inexpensive and easy to install.

It is another object of the present invention to provide a deadend for joining aerial fiber optic transmission, ground wire or conductor cables to support structures that is compact and lightweight.

It is a further object of the present invention to provide a deadend that can accommodate cables of different sizes.

It is still a further object of the present invention to provide a deadend that is capable of being used on different types of cable construction.

It is yet another object of the present invention to provide a deadend for joining aerial fiber optic transmission, ground wire or conductor cables to support structures that is easy, fast and safe to install and does not require special tools for installation.

It is still another object of the present invention to provide a deadend for joining aerial fiber optic transmission, ground wire or conductor cables to support structures that meets the system performance requirements of strength and long term reliability without deteriorating cable performance.

Additional objects and advantages of the invention will be set forth in the description that follows.

SUMMARY OF THE INVENTION

This invention is directed to a deadend device, called a wedge deadend, employed to attach aerial fiber optic transmission, ground wire or conductor cables to support structures such as poles or towers. The wedge deadend has a body with an attachment eye for mounting the deadend to a support structure. The body accommodates multiple interlocking wedges. The wedges track the inside of the body and interlock with each other via teeth. When the body is closed, the wedges form an opening through which cable can be strung. An elastomer nose bushing may be used to cushion the cable or conductor from abrasion at the span end of the body.

The body consists of multiple hinged segments that are opened and closed to load and access cable. The body hinges are incorporated onto the body segments using a method of casting which will eliminate the need for machining. The body segments are tapered such that one end of the body when closed is angled inwardly. The wedges are similarly tapered enabling them to be interlocked with the body segments. The wedges also have a groove that is sized and textured to grip cables of various range diameters. The wedges are designed to compress the encased cable evenly along the entire contact surface of the cable.

The deadend is installed by hand by opening the body, shifting the wedges toward the attachment eye end of the body, aligning the ends of the wedges and then placing the cable inside the wedges located in a portion of the body. The body is then closed such that the wedges located in the upper portion of the body complete the encasement of the cable. A securing fastener is used to maintain the body closed. The tension and the weight of the cable advances the wedges forward toward the span end of the body to provide a grip force about the cable that is proportional to the cable pull. The taper of the body and the corresponding taper of the wedges make the deadend self-loading when cable pull is applied. This taper prevents the wedges from backing and loosing the grip about the cable. Finally, the attachment eye is attached to the support structure.

DETAILED DESCRIPTION OF PREFERRED EMBODIMENTS

Figure 1:
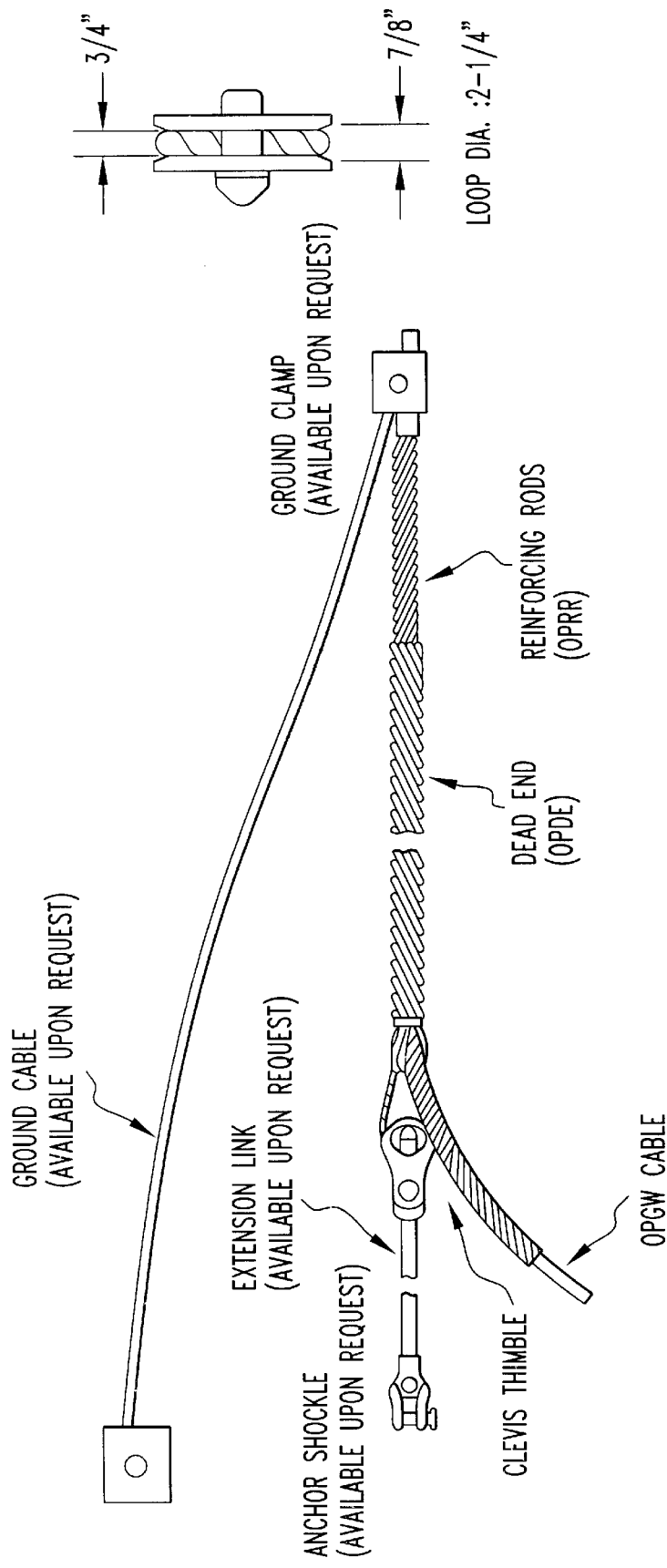
FIGS. 1 and 2 illustrate prior art formed wire deadends where no apparatus as in the present invention is utilized.
Figure 2:
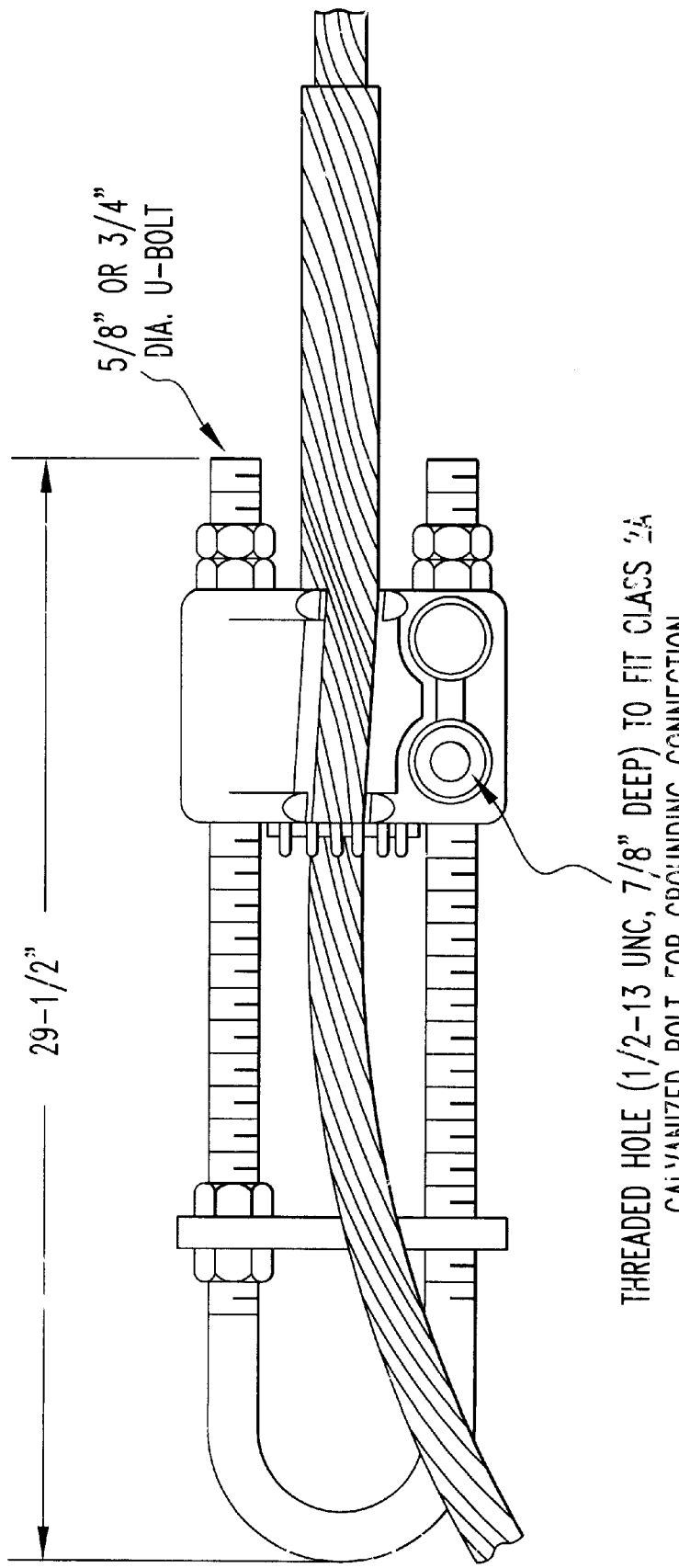
Figure 3:
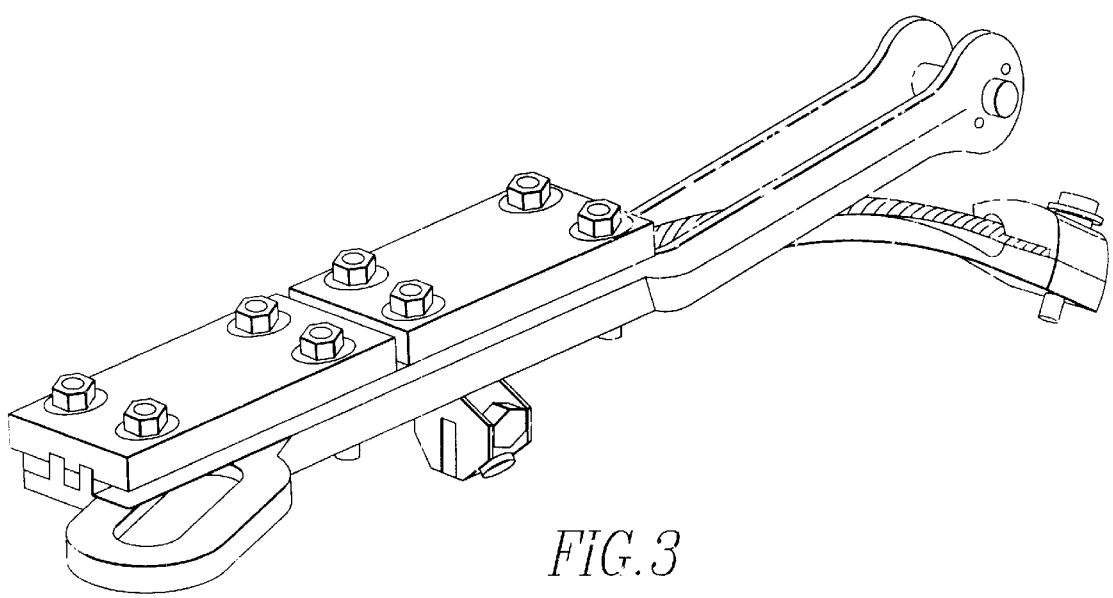
FIGS. 3 and 4 illustrate prior art bolted deadends where no apparatus as in the present invention is utilized.
Figure 4:
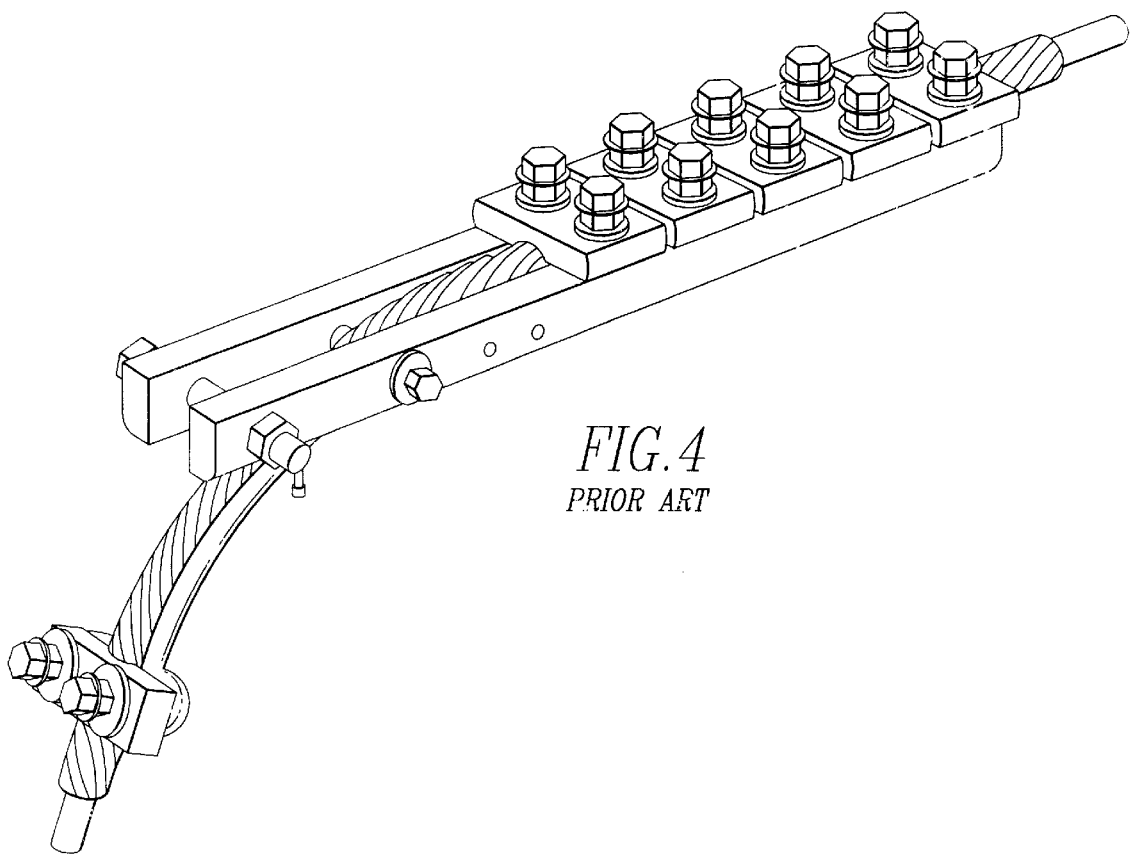
Figure 5:
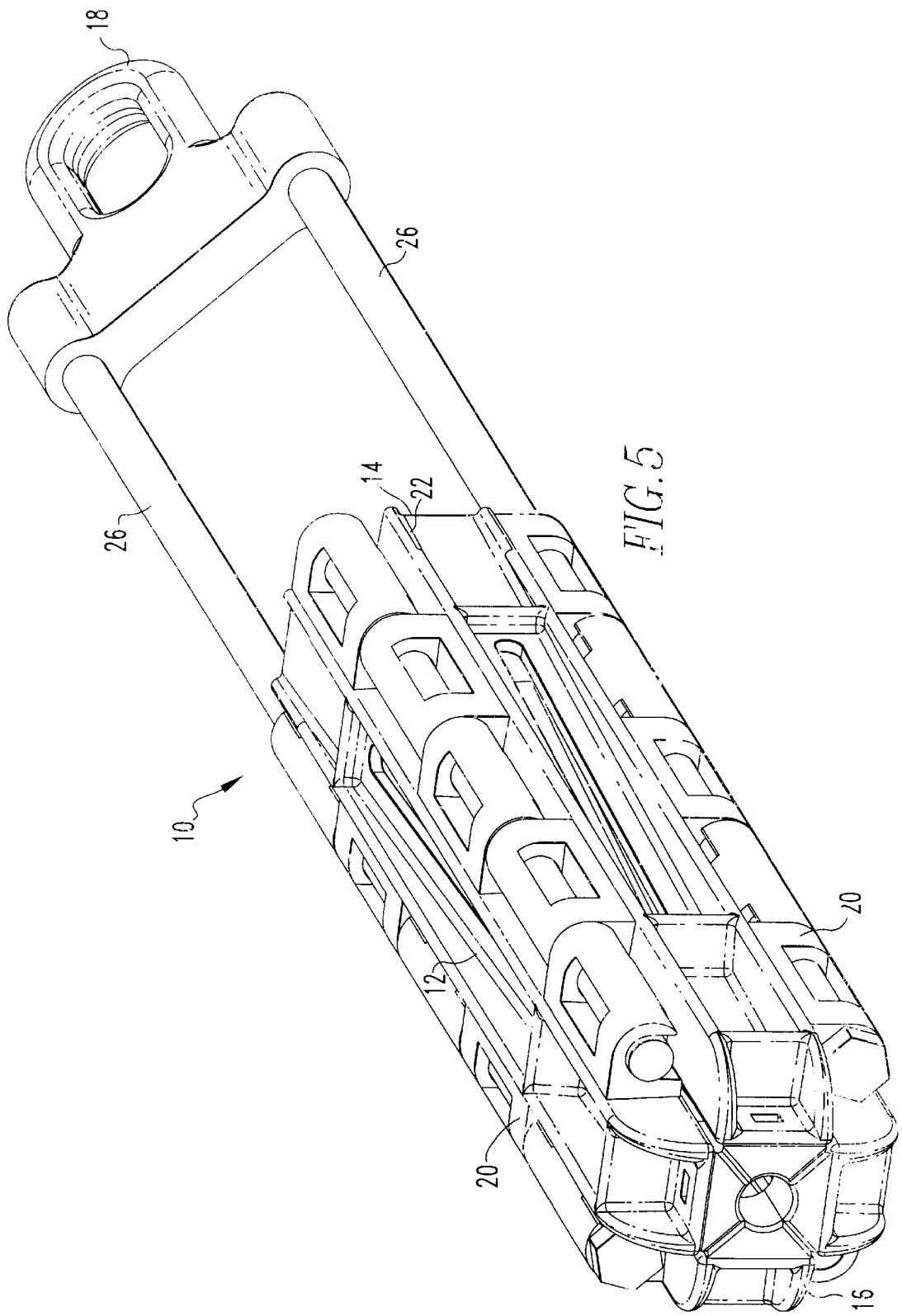
FIG. 5 is a perspective view of the deadend of this invention.

FIG. 5 depicts the wedge deadend of the subject invention, indicated generally by the reference numeral 10. Deadend 10 consists of body 12, attachment body eye end 14, span body end 16, wedges 16 (shown in FIG. 7) and attachment eye 18 which is integral to body 12 and is used to mount or otherwise fasten deadend 10 to a support structure (not shown). Body 12 has multiple, preferably four, body segments 20 that attach via hinges 22. Pins or bars 26 extending from attachment eye 18 mate hinges 22 of body segments 20 such that body 12 is formed.

Figure 6:
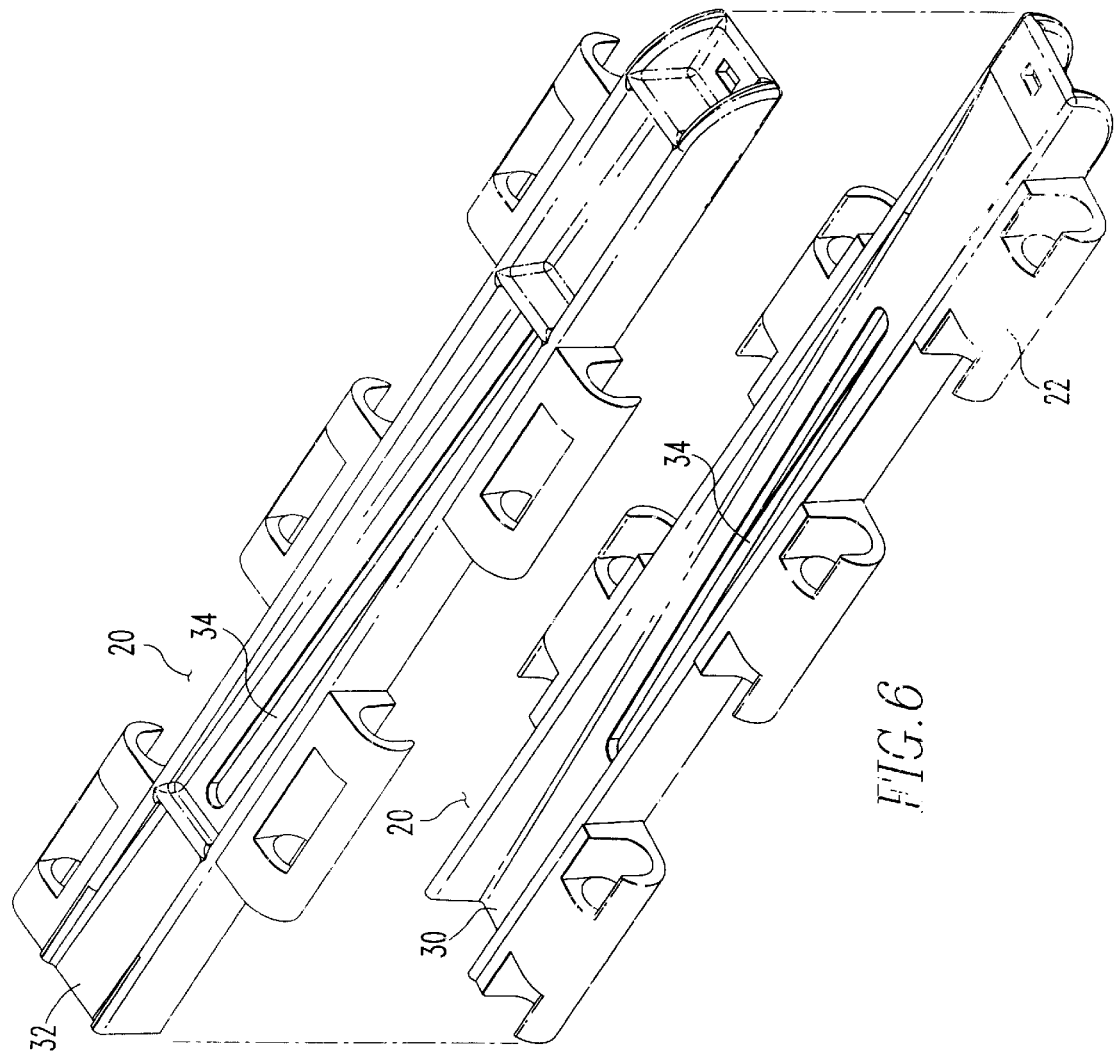
FIG. 6 is a top and bottom view of a body segment of this invention.

As shown in FIG. 6, a body segment 20 has an inner surface 30, an outer surface 32, and slot 34. Slot 34 extends longitudinally in the midportion of body segment 20 and terminates short of the ends. Body segments 20 are tapered to accept wedges 16 as described below.

Figure 7:
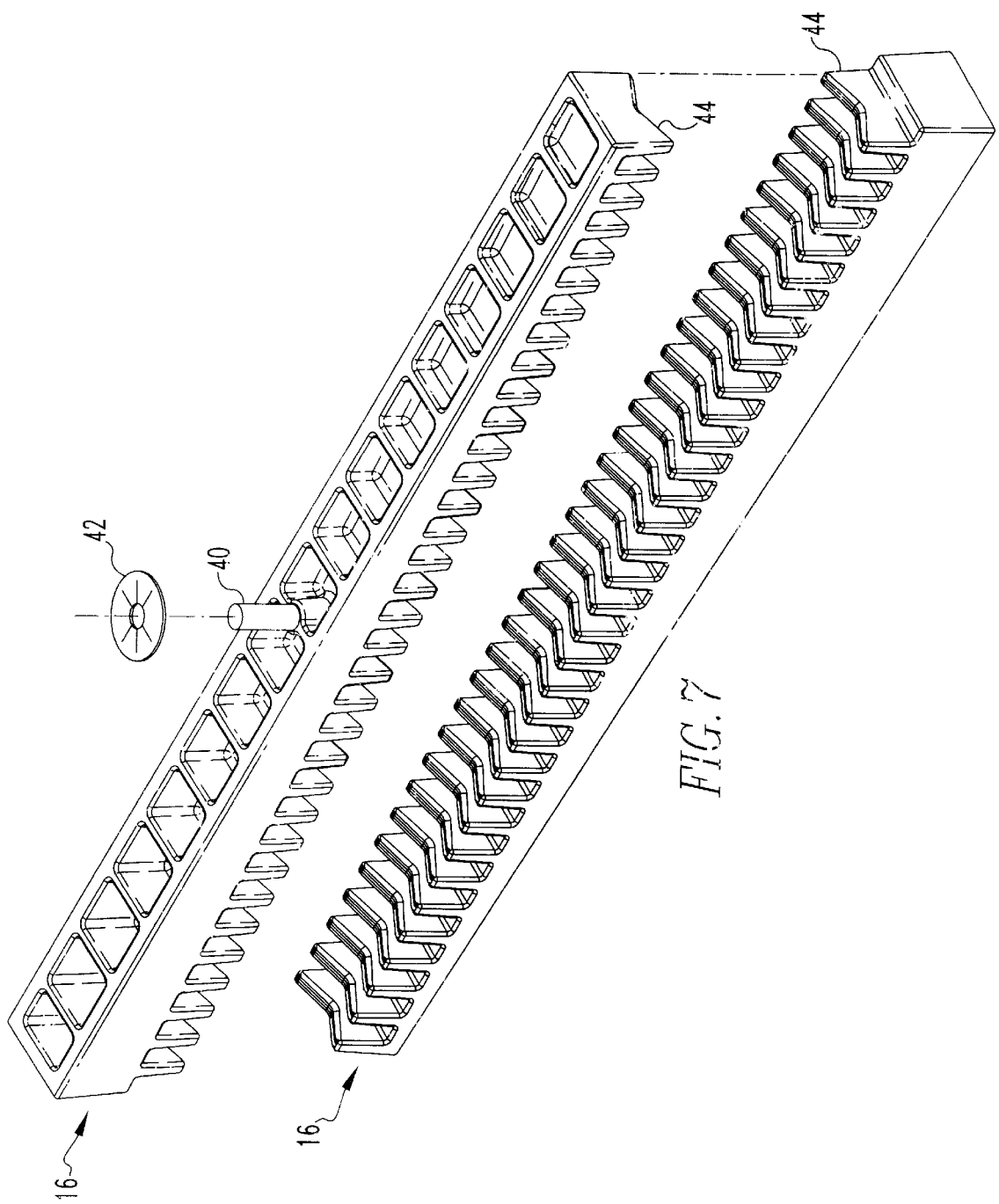
FIG. 7 is a top and bottom view of a wedge of the deadend of this invention.
Figure 8:
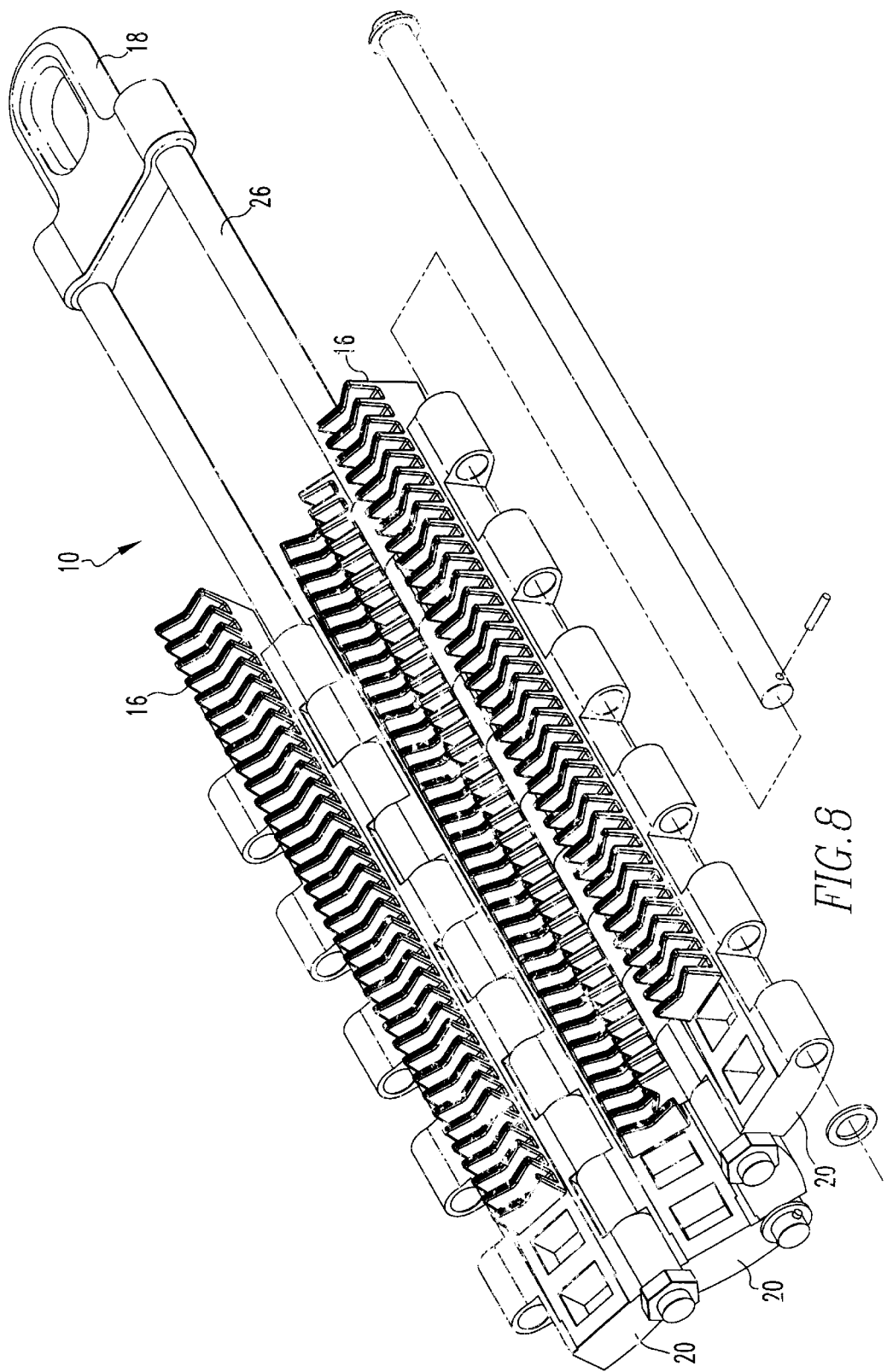
FIG. 8 is a perspective view of the deadend in an open position showing the body and wedges of the deadend of this invention.

As shown in FIG. 7, a top and bottom view of a wedge is shown. Wedge 16 has a boss 40 that is inserted into slot 34 of body segment 20. Disk 42 is used to secure wedge 16 and body segment 20 but permits wedge 16 to slide longitudinally with respect to body segment 20. The wedges are longitudinally tapered at the same angle as body segments 20. Wedges 20 also have interlocking teeth 44 which permit the wedges to work as an integral assembly. Note that when using four wedges as depicted in FIGS. 5 and 8, there is a slight variation of how the teeth extend to the ends of the wedges. This is so that the ends of the wedges are flush during installation of the deadend.

Wedges 20 are positioned in body 10 as shown in FIG. 8 such that wedges cooperate to form an opening 70 for receiving and encasing a cable (not shown) when deadend 10 is in use. The wedges are designed to compress the cable evenly along the entire cable contact area and can accommodate cables ranging from about 0.4 inches to 1.0 inches in diameter. The interlocking teeth create holding friction over the entire surface of the encased cable. The force of the wedges is concentrated circumferentially on the outer strands of the cable. This force is evenly distributed causing no cable deformation and thus works well on fiber optic cable which is generally somewhat fragile.

The tension and the weight of the cable when loaded in the deadend advances the wedges forward toward the span end of the body to provide a grip force about the cable that is proportional to the cable pull. The taper of the body and the corresponding taper of the wedges make the deadend self-locking when cable pull is applied. This taper prevents the wedges from backing and loosing the grip about the cable when cable motion occurs.

Again, the wedging action creates a grip or squeeze, proportional to the pull or tension on the cable. That is, the greater the pull condition, the tighter the grip. Therefore the deadend is capable of holding a small cable with little pull with little squeeze and also hold a large cable with high tension with more squeeze.

Installation of the subject deadend is fast and easy. There are no special tools required. The deadend installs within approximately thirty inches of the support structure and does not require great hand strength or dexterity. The actual size of wedge deadend 10 depends on the specific application for which it will be used. Attachment eye is attached to the support structure and can be attached via mechanical fasteners the support structure.

The design of the body and wedges make the deadend cost effective to manufacture. Preferably, the wedges of the deadend are made of cast stainless steel but may be made of aluminum for various applications. The body can be made from either die-cast aluminum or cast stainless steel. Obviously, a diecast aluminum body is more attractive from a cost perspective, while cast stainless steel is more attractive from the standpoint of strength. Thus, the resulting deadend is compact, lightweight, and easy and inexpensive to manufacture and to install. Most importantly, the wedge deadend meets system performance requirements of strength and long term reliability without hindering cable performance.

Having described the presently preferred embodiments, it is to be understood that the invention may be otherwise embodied within the scope of the appended claims.

What is claimed is:

1. An apparatus for securing fiber optic transmission lines or cable comprising:
    a body formed by multiple attaching segments, each said segment having an inner and outer surface and a slot extending longitudinally on the midportion of the inner surface of said segment;
    multiple interlocking wedges, each said wedge having inner and outer surface, said outer surface of each wedge having a boss which corresponds to said slots of said body segments so that each said wedge can be interlocked with each said segment, each said wedge having teeth that permit said wedges to interlock such that a longitudinal opening is formed by said teeth for seating a cable when said body is closed.

2. The apparatus of claim 1 wherein said body segments attach via hinges.

3. The apparatus of claim 2 wherein said hinges are integral to said body segments.

4. The apparatus of claim 1 wherein said apparatus consists of said body having four body segments and four wedges.

5. The apparatus of claim 1 wherein said body has one end and a second end, and said body segments are tapered such that said one end of said body is angled inwardly when said body is closed and the apparatus is self-locking when cable pull is applied.

6. The apparatus of claim 5 wherein said wedges are correspondingly tapered to said tapered body segments.

7. The apparatus of claim 1 further including means for attaching said apparatus to a support structure.

8. The apparatus of claim 7 wherein said means for attaching said apparatus to a support structure is an attaching eye.

9. The apparatus of claim 1 wherein the longitudinal opening or a portion of said opening for said cable is lined with a elastomer bushing.

10. The apparatus of claim 5 wherein said slots of said body segments do not extend completely to said one end and said second end of said body.

11. The apparatus of claim 1 wherein each said wedge is secured to said corresponding body segment such that said wedges can move longitudinally with respect to said body segments.

12. The apparatus of claim 1 wherein said body segments are made from die-cast aluminum or cast stainless steel and said wedges are made of cast stainless steel or aluminum.

13. The apparatus of claim 1 wherein said longitudinal opening for said cable is circular.

14. The apparatus of claim 1 wherein said opening formed by said wedges and said teeth create a well-distributed, appropriate holding friction over entire said cable.

* * * * *